(12) United States Patent
Uragami et al.

(10) Patent No.: US 11,740,141 B2
(45) Date of Patent: Aug. 29, 2023

(54) PRESSURE-SENSITIVE ELEMENT

(71) Applicant: Panasonic Intellectual Property Management Co., Ltd., Osaka (JP)

(72) Inventors: Susumu Uragami, Osaka (JP); Hiroyuki Furuya, Osaka (JP); Yuta Moriura, Osaka (JP); Takashi Matsumoto, Osaka (JP); Hironobu Ukitsu, Osaka (JP); Shinobu Masuda, Osaka (JP); Mitsutaka Matsumoto, Kyoto (JP); Yui Sawada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 199 days.

(21) Appl. No.: 17/354,907

(22) Filed: Jun. 22, 2021

(65) Prior Publication Data

US 2021/0318188 A1 Oct. 14, 2021

Related U.S. Application Data

(63) Continuation of application No. PCT/JP2019/048582, filed on Dec. 11, 2019.

(30) Foreign Application Priority Data

Jan. 24, 2019 (JP) .................................. 2019-010402

(51) Int. Cl.
*G01L 1/14* (2006.01)
(52) U.S. Cl.
CPC ..................................... *G01L 1/144* (2013.01)
(58) Field of Classification Search
CPC .................................. G01L 1/144; G01L 1/146
See application file for complete search history.

(56) References Cited

U.S. PATENT DOCUMENTS

| 11,150,147 B2 * | 10/2021 | Horter ...................... D03D 1/00 |
| 2019/0277713 A1 | 9/2019 | Moriura et al. |
| 2021/0223119 A1 * | 7/2021 | Moriura .................... G01L 5/22 |

FOREIGN PATENT DOCUMENTS

| CN | 107923081 A * | 4/2018 | ........... A41D 27/205 |
| DE | 102016106071 A1 * | 10/2017 | ........... D03D 1/0088 |

(Continued)

OTHER PUBLICATIONS

International Search Report of PCT application No. PCT/JP2019/048582 dated Mar. 17, 2020.

*Primary Examiner* — Octavia Davis Hollington
(74) *Attorney, Agent, or Firm* — McDermott Will & Emery LLP

(57) ABSTRACT

Provided is a pressure-sensitive element having a relatively wide measurement range of a pressing force and a relatively simple structure while having more sufficient stretchability. A pressure-sensitive element includes a base material, a plurality of conductor wires, a plurality of dielectrics, and a filamentous member. The base material includes an elastic conductor having elasticity and conductivity. Further, the base material has a sheet shape. The plurality of conductor wires are arranged in parallel so as to individually intersect with the elastic conductor in plan view. Further, each of the plurality of conductor wires has a plurality of inflection parts. The plurality of dielectrics are arranged between the elastic conductor and the plurality of conductor wires. The filamentous member elongates so as to intersect with the plurality of conductor wires in plan view. Further, the filamentous member sews the plurality of conductor wires to the base material.

11 Claims, 7 Drawing Sheets

(56) References Cited

FOREIGN PATENT DOCUMENTS

| | | | |
|---|---|---|---|
| JP | 2006-317340 | | 11/2006 |
| JP | 2011-102457 | | 5/2011 |
| JP | 2013-108754 | | 6/2013 |
| JP | 5519068 B | | 6/2014 |
| JP | 2014-190712 | | 10/2014 |
| JP | 2018200210 A | * | 12/2018 |
| KR | 20160118110 A | * | 10/2016 |
| KR | 20170093655 A | * | 8/2017 |
| WO | 2018/096901 | | 5/2018 |
| WO | WO-2018181641 A1 | * | 10/2018 ............... B06B 1/06 |
| WO | WO-2022181254 A1 | * | 9/2022 |

\* cited by examiner

PRESSURE-SENSITIVE ELEMENT

BACKGROUND

1. Technical Field

The present disclosure relates to a pressure-sensitive element.

2. Description of the Related Art

Pressure-sensitive elements are widely used in fields such as industrial devices, robots, and vehicles, by being attached to parts to be touched by humans as pressure sensitive sensors to detect a pressing force (a contact pressure). In recent years, with development of computer-based control technology and improvement of design, development of electronic devices that variously use freeform surfaces such as humanoid robots and interior parts of automobiles is in progress. Along with this, it is required to mount a high-performance pressure-sensitive element on each freeform surface. For example, PTLs 1 to 3 disclose related art of these.

CITATION LIST

Patent Literature

PTL 1: Unexamined Japanese Patent Publication No. 2011-102457
PTL 2: Japanese Patent Publication No. 5519068
PTL 3: Unexamined Japanese Patent Publication No. 2014-190712

SUMMARY

After diligent study, the inventors of the present application have found this time that, in a pressure-sensitive element used as an electrostatic capacity type pressure sensitive sensor, there are points to be improved in stretchability of the entire pressure-sensitive element, a measurement range (a dynamic range) of a pressing force, and simplification of a structure.

For example, since a touch sensor of PTL 1 is configured by stacking at least two conductive cloths face-to-face, stretchability of the sensor as a whole is not sufficient. Further, in the touch sensor of PTL 1, since a pressing force is detected by utilizing a change in an electrostatic capacity based on a change in a distance between conductive threads, a measurement range of the pressing force is relatively narrow.

Further, for example, in a tactile sensor of PTL 2, since detection elements are connected by a connector having a crank-shaped bent structure, stretchability of the sensor as a whole is not sufficient. Further, in the tactile sensor of PTL 2, since it is required to connect the detection elements by the connector having a crank-shaped bent structure, a structure of a pressure-sensitive element is complicated.

Further, for example, in a sensor of PTL 3, since a load sensor part includes a front side electrode and a back side electrode respectively arranged on a front side and a back side of an elastomer base material, and detects a pressing force on the basis of a change in a distance between the electrodes due to pressing, a measurement range of the pressing force is relatively narrow.

The present disclosure has been made in view of such circumstances. That is, an object of the present disclosure is to provide a pressure-sensitive element having a relatively wide measurement range of a pressing force and a relatively simple structure while having more sufficient stretchability.

A pressure-sensitive element according to one aspect of the present disclosure includes a plurality of conductor wires, a plurality of dielectrics, and a filamentous member. A base material has a sheet shape and includes an elastic conductor. The elastic conductor has elasticity and conductivity. The plurality of conductor wires are arranged in parallel so as to individually intersect with the elastic conductor in plan view. Each of the plurality of conductor wires has a plurality of inflection parts. The plurality of dielectrics are arranged between the elastic conductor and the plurality of conductor wires. The filamentous member elongates so as to intersect with the plurality of conductor wires in plan view. Further, the filamentous member sews the plurality of conductor wires to the base material. In accordance with a pressing force applied between the base material and each of the conductor wires, an electrostatic capacity between the elastic conductor and each of the conductor wires changes.

According to the present disclosure, it is possible to obtain a pressure-sensitive element having a relatively wide measurement range of a pressing force and a relatively simple structure while having more sufficient stretchability.

DETAILED DESCRIPTION

Figure 1:
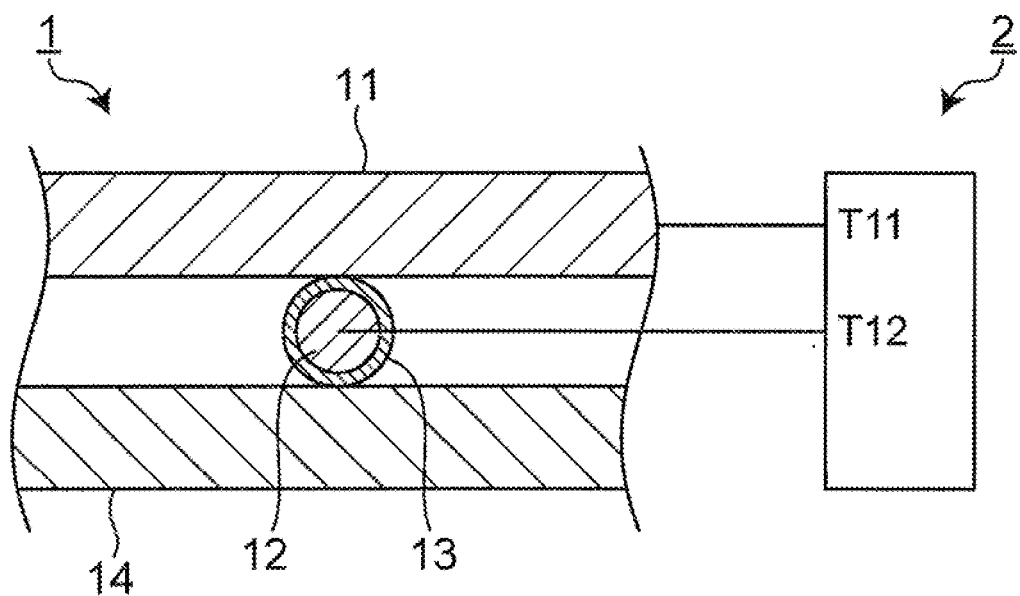
FIG. 1 is a cross-sectional view schematically showing an example of a basic structure of a pressure-sensitive element, for explaining a basic pressure measurement mechanism adopted by a pressure-sensitive element of the present exemplary embodiment.

In order to achieve an object of the present disclosure, the present disclosure is configured as follows.

According to a first aspect of the present disclosure, a pressure-sensitive element includes a base material, a plurality of conductor wires, a plurality of dielectrics, and a filamentous member. A base material has a sheet shape and includes an elastic conductor. The elastic conductor has elasticity and conductivity. The plurality of conductor wires are arranged in parallel so as to intersect with the elastic conductor in plan view. Further, each of the plurality of conductor wires has a plurality of inflection parts. The plurality of dielectrics are individually arranged between the elastic conductor and the plurality of conductor wires. The filamentous member elongates so as to intersect with the plurality of conductor wires in plan view. Further, the filamentous member sews the plurality of conductor wires to the base material. In accordance with a pressing force applied between the base material and each of the conductor wires, an electrostatic capacity between each of the conductor wires and the elastic conductor changes.

A pressure-sensitive element of a second aspect of the present disclosure further has the following configuration with respect to the pressure-sensitive element of the first aspect. That is, the elastic conductor has a plurality of conductors. The plurality of conductors are arranged in parallel so as to individually intersect with the plurality of conductor wires in plan view. The base material is provided with an insulator between conductors adjacent to each other. The filamentous member is sewn to the insulator.

A pressure-sensitive element of a third aspect of the present disclosure further has the following configuration with respect to the pressure-sensitive element of the second aspect. That is, each of the conductor wires has the plurality of inflection parts at a position facing the insulator, and the filamentous member sews the plurality of conductor wires to the insulator to straddle the inflection parts each being included in the plurality of inflection parts of a corresponding one of the plurality of conductor wires.

A pressure-sensitive element of a fourth aspect of the present disclosure further has the following configuration with respect to the pressure-sensitive element of the third aspect. That is, the filamentous member further sews the plurality of conductor wires to the base material so as to straddle between the inflection parts adjacent to each other in each of the conductor wires in plan view.

A pressure-sensitive element of a fifth aspect of the present disclosure further has the following configuration with respect to the pressure-sensitive element of the third aspect. That is, the filamentous member further sews the plurality of conductor wires on the insulator so as to straddle between the inflection parts adjacent to each other in each of the conductor wires in plan view.

A pressure-sensitive element of a sixth aspect of the present disclosure further has the following configuration with respect to the pressure-sensitive element of any one of the third to fifth aspects. That is, in plan view, the filamentous member sews the plurality of conductor wires to the base material so as to straddle the inflection part in a multiple manner.

A pressure-sensitive element of a seventh aspect of the present disclosure further has the following configuration with respect to the pressure-sensitive element of any one of the third to fifth aspects. That is, in plan view, the filamentous member sews the plurality of conductor wires to the base material so as to straddle a vicinity portion of the inflection part of the conductor wires three times or more.

A pressure-sensitive element according to an eighth aspect of the present disclosure further includes a sheet-shaped member arranged so as to face the base material with the conductor wire interposed in between, with respect to the pressure-sensitive element in any one of the first to seventh aspects.

A pressure-sensitive element of a ninth aspect of the present disclosure further has the following feature with respect to the pressure-sensitive element of any one of the first to eighth aspects. That is, the filamentous member has stretchability.

Exemplary Embodiment

A pressure-sensitive element according to the present exemplary embodiment is a pressure-sensitive element having a capacitance, and has a capacitor function. In the pressure-sensitive element according to the present exemplary embodiment, application of a pressing force causes a capacitance change, and the pressing force is detected from the capacitance change. Therefore, the pressure-sensitive element according to the present exemplary embodiment is also referred to as an "electrostatic capacity type pressure sensitive sensor element", a "capacitive pressure detection sensor element", a "pressure sensitive switch element", or the like. The pressure-sensitive element according to the present exemplary embodiment may be referred to as a "pressure sensitive device".

Hereinafter, the pressure-sensitive element according to the present exemplary embodiment will be described with reference to the drawings. It should be noted that various components shown in the drawings are merely schematically shown for the purpose of understanding the present disclosure, and a dimensional ratio, appearance, and the like may differ from the actual ones. Further, unless otherwise specified, the same reference numerals or symbols are to indicate the same members or the same meanings.

(Basic Measurement Mechanism)

Figure 2:
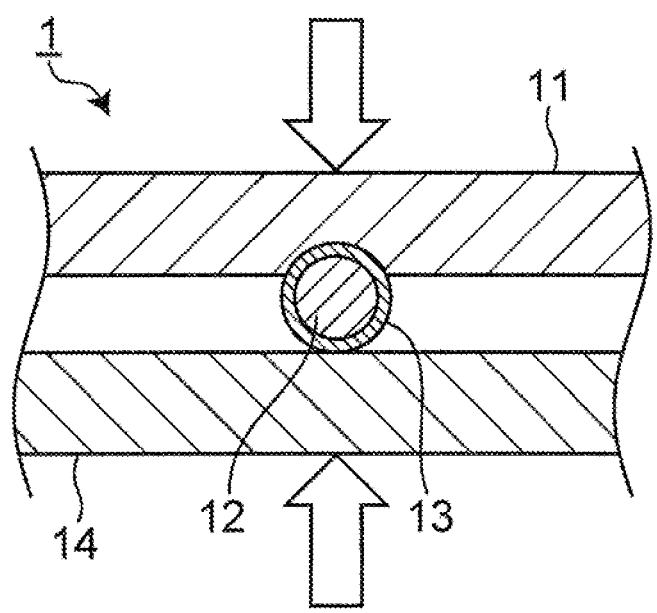
FIG. 2 is a cross-sectional view schematically showing a state in which a pressing force is applied to the pressure-sensitive element of FIG. 1.

FIG. 1 is a cross-sectional view schematically showing an example of a basic structure of a pressure-sensitive element, for explaining a basic pressure measurement mechanism adopted by the pressure-sensitive element according to the present exemplary embodiment. FIG. 2 is a cross-sectional view schematically showing a state in which a pressing force is applied to the pressure-sensitive element of FIG. 1.

As shown in FIG. 1, the pressure-sensitive element according to the present exemplary embodiment includes pressure sensitive part 1 to which a pressing force is applied, and detector 2 configured to detect the pressing force. Pressure sensitive part 1 includes elastic conductor 11 having elasticity and conductivity, conductor wire 12, dielectric 13 that is an insulating coating to cover a surface of conductor wire 12, and sheet-shaped member 14 facing elastic conductor 11 via conductor wire 12 and dielectric 13.

Detector 2 is a circuit that detects a pressing force on the basis of a change in an electrostatic capacity between elastic conductor 11 and conductor wire 12. In detector 2, terminal T11 is electrically connected to elastic conductor 11, and terminal T12 is electrically connected to conductor wire 12. Detector 2 is, for example, a control circuit, an integrated circuit, or the like. From the viewpoint of stabilizing pressing force detection by reducing an influence of noise, elastic conductor 11 is preferably connected to the ground.

In the pressure-sensitive element according to the present exemplary embodiment, when a pressing force is applied to pressure sensitive part 1, as shown in FIG. 2, an area of a contact region between elastic conductor 11 and dielectric 13 (hereinafter, also simply referred to as a "contact region area") expands on the basis of the elasticity of elastic conductor 11. This results in changing electrostatic capacity C [pF] between elastic conductor 11 and conductor wire 12. Electrostatic capacity C [pF] and pressing force F [N] applied to pressure sensitive part 1 are expressed by the following equations, respectively.

$$C = \frac{\varepsilon S}{d} \quad \text{[Formula 1]}$$

$$F = E \cdot eS \quad \text{[Formula 2]}$$

Note that, in the above equations, ε [pF/m] is a dielectric constant of dielectric 13, S [m²] is a contact area between elastic conductor 11 and dielectric 13, d [m] is a thickness of dielectric 13, E [Pa] is a Young's modulus of elastic conductor 11, and e is a strain of elastic conductor 11.

In a conventional pressure-sensitive element, pressing force F is detected by detecting a change in electrostatic capacity C through a change in a distance between electrodes. Whereas, in the pressure-sensitive element according to the present exemplary embodiment, pressing force F is detected by detecting a change in electrostatic capacity C on the basis of a change in the area of the contact region. In the change of electrostatic capacity C, contribution by the change in the area of the contact region is larger than contribution by the change in the distance between the electrodes. In particular, when magnitude of pressing force F is small, the change in electrostatic capacity C based on a change in a distance between the electrodes is very small since the distance between the electrodes hardly changes due to application of pressing force F. Whereas, even if magnitude of pressing force F is small, the area of the contact region changes due to the application of pressing force F. Electrostatic capacity C is proportional to the area of the contact region, but inversely proportional to the distance between the electrodes (C ∝S, C ∝1/d). Therefore, the change in electrostatic capacity C based on the change in the area of the contact region is large. Accordingly, the pressure-sensitive element of the present exemplary embodiment has a wider measurement range of pressing force F than that of the conventional pressure-sensitive element.

In the pressure-sensitive element according to the present exemplary embodiment, a pressing force is measured by detecting a change in an electrostatic capacity between terminal T11 and terminal T12 based on a change in the area of the contact region. The change in the area of the contact region is relatively larger than the change in the distance between the electrodes in the conventional pressure-sensitive element. Therefore, according to the pressure-sensitive element according to the present exemplary embodiment, it is possible to measure a pressing force in a relatively wide range with a relatively simple structure.

Note that, in the above description, dielectric 13 is configured to cover the surface of conductor wire 12, but the configuration of the pressure-sensitive element of the present disclosure is not limited to this. For example, dielectric 13 is only required to be arranged between elastic conductor 11 and conductor wire 12.

Further, in the above description, one conductor wire 12 is arranged between elastic conductor 11 and sheet-shaped member 14, but the configuration of the pressure-sensitive element of the present disclosure is not limited to this. For example, a stranded wire formed by twisting a plurality of conductor wires 12 may be used between elastic conductor 11 and sheet-shaped member 14. According to this configuration, the measurement range of the pressing force can be further expanded and the accuracy of the pressure measurement can be improved. By improving the accuracy of pressure measurement, for example, even a minute pressing force that has been difficult to detect in the past can be detected. Note that dielectric 13 may be provided so as to cover a periphery of the stranded wire. Further, dielectric 13 may be provided so as to cover a periphery of each of the plurality of conductor wires 12 forming the stranded wire.

Moreover, sheet-shaped member 14 may be a member different from elastic conductor 11, or may be the same member as elastic conductor 11. Forming sheet-shaped member 14 with the same member as elastic conductor 11 makes it also possible to measure a change in an electrostatic capacity between sheet-shaped member 14 and conductor wire 12, for example, on the basis of a change in an area of a contact region between sheet-shaped member 14 and conductor wire 12. This can improve the accuracy of the pressure measurement. Further, deformation due to a pressing force can be dispersed in both elastic conductor 11 and sheet-shaped member 14, and the measurement range of the pressing force can be expanded. Further, a degree of deformation of elastic conductor 11 can be reduced, and a service life of elastic conductor 11 can be extended.

(Structure of Pressure-Sensitive Element)

Figure 3:
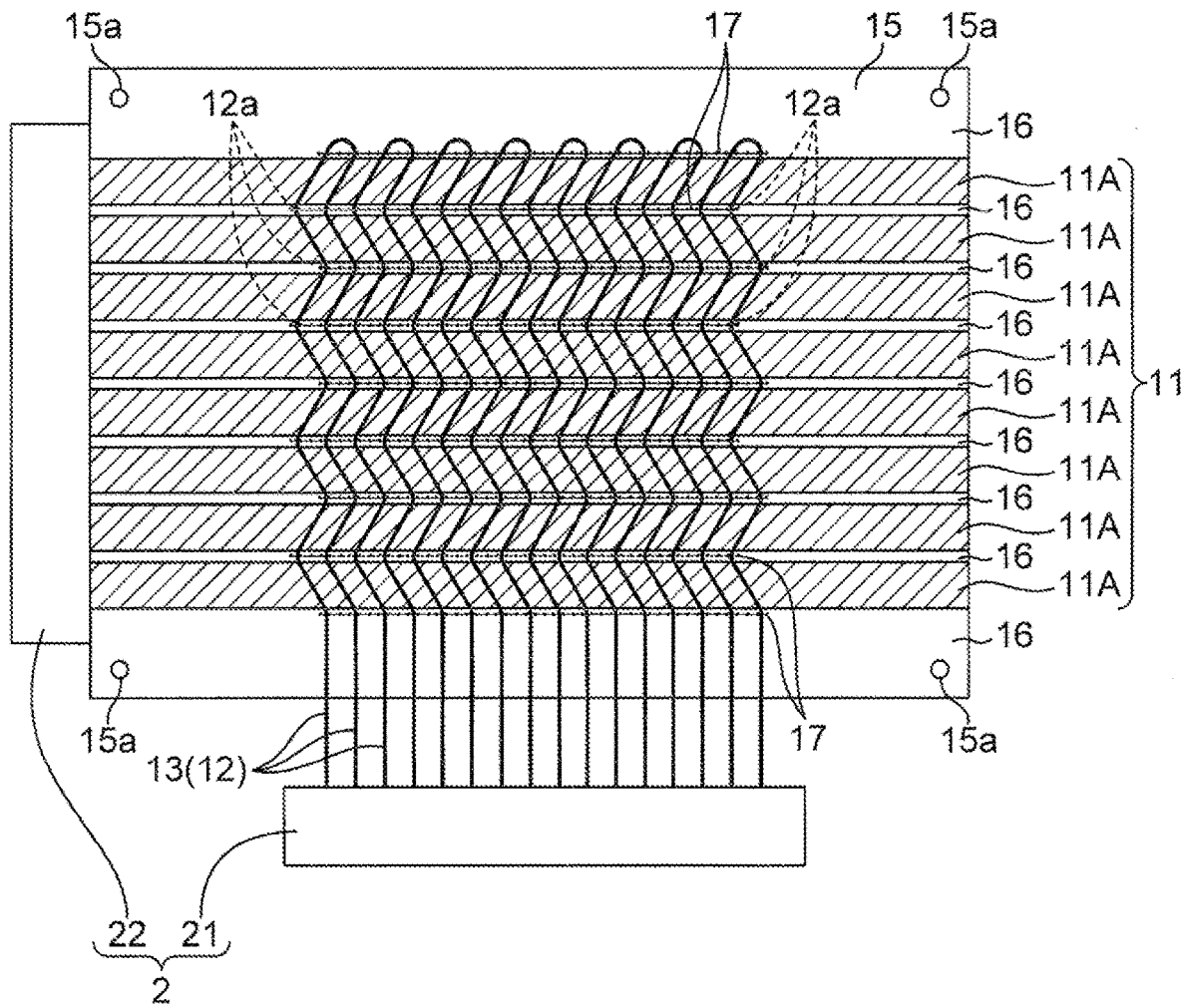
FIG. 3 is a plan view showing the entire structure of the pressure-sensitive element according to the present exemplary embodiment.

FIG. 3 is a plan view showing the entire structure of the pressure-sensitive element according to the present exemplary embodiment.

As shown in FIG. 3, the pressure-sensitive element according to the present exemplary embodiment includes sheet-shaped base material 15 having elastic conductor 11, and a plurality of conductor wires 12 each covered with dielectric 13.

In the present exemplary embodiment, as shown in FIG. 3, elastic conductor 11 has a plurality of conductors 11A arranged in parallel so as to individually intersect with each of the plurality of conductor wires 12, in plan view seen from a thickness direction of base material 15. The plurality of conductors 11A each are formed in a straight strip shape, and are arranged in parallel with each other with an interval therebetween. Conductor 11A has elasticity that causes local deformation due to an external force and returns to an original shape when the force is removed. Due to the elasticity of conductor 11A, conductor 11A can expand and contract even if an external force is applied to base material 15 in an extending direction of conductor 11A and a direction orthogonal to the extending direction. Further, conductor 11A has a lower elastic modulus than that of dielectric 13 so as to be deformed more than dielectric 13 when pressed. Conductor 11A is made of, for example, a conductive rubber in which conductive particles are dispersed in a rubber material. Conductor 11A is made of, for example, a conductive silicon rubber in which carbon is dispersed in the silicon rubber. Note that conductor 11A is desirably connected to a ground (0V) of detector 2 from the viewpoint of inhibiting noise when measuring a pressing force.

Base material 15 includes insulator 16 between conductors 11A and 11A adjacent to each other. Further, in the present exemplary embodiment, base material 15 is provided with insulator 16 at a position facing each other via the plurality of conductors 11A in plan view. That is, base material 15 includes a plurality of insulators 16 so as to individually sandwich each of conductors 11A. This configuration makes it possible to suppress a short circuit due to contact between conductors 11A and 11A adjacent to each other, and to improve the measurement accuracy. In the present exemplary embodiment, base material 15 includes insulator 16 having a plurality of grooves provided in parallel at intervals from each other, and the plurality of conductors 11A individually inserted into the plurality of grooves.

Insulator 16 has elasticity and insulating properties. Insulator 16 has elasticity that causes local deformation due to an external force and returns to an original shape when the force is removed. Due to the elasticity of insulator 16, insulator 16 can expand and contract even if an external force is applied to base material 15 in an elongating direction of insulator 16 and the direction orthogonal to the elongating direction. Further, insulator 16 has a lower elastic modulus than that of dielectric 13 so as to be deformed more than dielectric 13 when pressed. Insulator 16 is made of, for example, a rubber material. Insulator 16 is made of, for example, non-conductive silicone rubber. Note that conductor 11A is desirably connected to a ground (0V) of detector 2 from the viewpoint of inhibiting noise when measuring a pressing force.

The plurality of conductor wires 12 are arranged in parallel so as to individually intersect with elastic conductor 11 in plan view. In the present exemplary embodiment, conductor wire 12 is a metal wire having conductivity (for example, a copper wire). Further, conductor wire 12 has a plurality of inflection parts 12a. In the present exemplary embodiment, conductor wire 12 is formed in a wave shape. That is, in conductor wire 12, an apex of amplitude is inflection part 12a. Inflection part 12a may be a portion that bends linearly (a bent portion) or a portion that bends curvilinearly (a curved portion). By forming conductor wire 12 in a wave shape, conductor wire 12 can expand and contract even if an external force is applied to base material 15 in a direction orthogonal to the extending direction of conductor 11A. Conductor wire 12 is formed in, for example, a sinusoidal wave shape, a rectangular wave shape, a triangular wave shape, a sawtooth wave shape, or a composite shape of these. Note that a cross-sectional shape of conductor wire 12 is not particularly limited, and may be, for example, a circular shape, an elliptical shape, a rectangular shape, a triangular shape, a trapezoidal shape, or the like. Further, the wave shape of conductor wire 12 may be periodic (regular) or non-periodic (irregular).

Further, the plurality of conductor wires 12 are arranged so as to individually intersect diagonally with the extending direction of conductor 11A in plan view. According to this configuration, a contact area between conductor 11A and conductor wire 12 can be larger than that of a case where the plurality of conductor wires 12 are arranged so as to be orthogonal to the elongating direction of conductor 11A in plan view. As a result, the accuracy of pressure measurement can be improved.

In the present exemplary embodiment, the surface of conductor wire 12 is covered with dielectric 13. Dielectric 13 has a higher elastic modulus or rigidity than that of elastic conductor 11 and conductor wire 12, so as not to be deformed more than elastic conductor 11 and conductor wire 12 when pressed. Examples of a wire material in which conductor wire 12 is covered with dielectric 13 include an insulating coated metal wire such as an enamel wire and an element wire. Using the insulating coated metal wire eliminates necessity of separately performing a process of arranging dielectric 13 between elastic conductor 11 and conductor wire 12, which can further simplify the structure of the pressure-sensitive element and suppresses a manufacturing cost. The plurality of conductor wires 12 are sewn to base material 15 by filamentous member 17.

Figure 4:
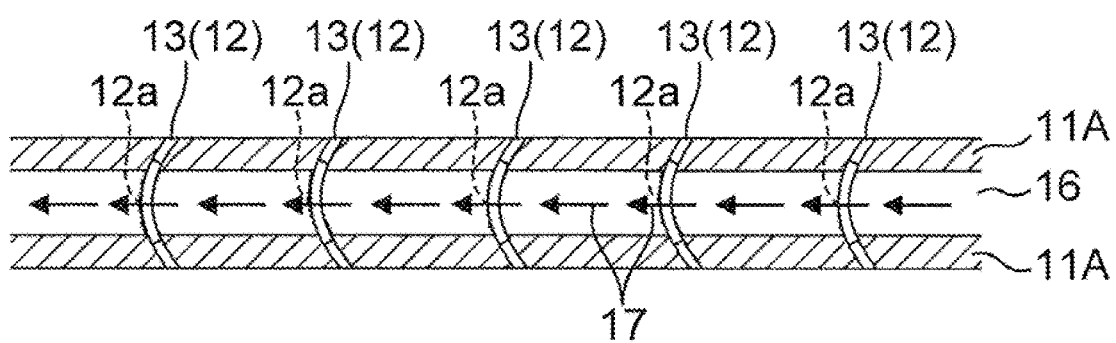
FIG. 4 is a plan view schematically showing a state of sewing a plurality of conductor wires to a base material with a filamentous member.
Figure 5:
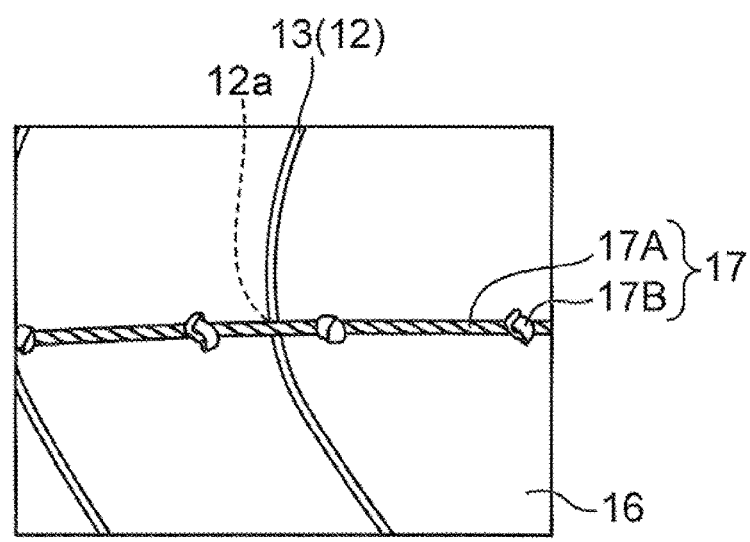
FIG. 5 is an enlarged plan view of FIG. 4.
Figure 6:
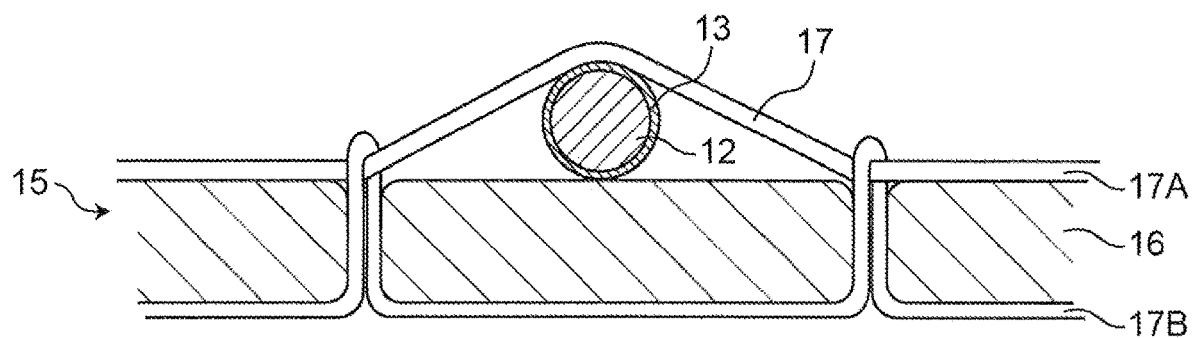
FIG. 6 is an enlarged cross-sectional view cut at an intersection of the conductor wire and the filamentous member.

FIG. 4 is a plan view schematically showing a state of sewing the plurality of conductor wires 12 to base material 15 by filamentous member 17. FIG. 5 is an enlarged plan view of FIG. 4. FIG. 6 is an enlarged cross-sectional view cut at an intersection of conductor wire 12 and filamentous member 17.

As shown in FIGS. 3 and 4, filamentous member 17 extends so as to intersect with the plurality of conductor wires 12 in plan view. That is, filamentous member 17 is arranged so as to straddle the plurality of conductor wires 12, and sews the plurality of conductor wires 12 to base material 15 at the same time. As a result, for example, even when the pressure-sensitive element is mounted on a curved surface, a position where the plurality of conductors 11A and the plurality of conductor wires 12 intersect can be constrained within a certain range, and reproducibility of a pressure sensitive position can be ensured. That is, it is possible to suppress a positional displacement of the plurality of conductor wires 12 with respect to elastic conductor 11, and more reliably detect a pressing force at a predetermined position. Further, filamentous member 17 can also suppress peeling off of dielectric 13 from conductor wire 12. Note that, in plan view, through hole 15a is provided near an end of base material 15.

In the present exemplary embodiment, filamentous member 17 is sewn to insulator 16 as shown in FIGS. 3 to 5. According to this configuration, filamentous member 17 does not penetrate conductor 11A, which makes it possible to suppress variations in the conductivity of conductor 11A due to an occurrence of cracks in conductor 11A. As a result, it is possible to suppress deterioration in the accuracy of the pressure measurement.

Further, as shown in FIGS. 3 to 5, each conductor wire 12 has inflection part 12a at a position facing insulator 16. Filamentous member 17 is sewn to insulator 16 so as to straddle inflection part 12a of each conductor wire 12. As a result, for example, even when base material 15 is repeatedly expanded and contracted, it is possible to suppress a positional displacement of the plurality of conductor wires 12 with respect to elastic conductor 11, and more reliably detect a pressing force at a predetermined position.

Further, in the present exemplary embodiment, filamentous member 17 is made by a stretchable thread that is used for a thread for knitting or the like. Since filamentous member 17 has stretchability, deterioration in the stretchability of base material 15 due to filamentous member 17 can be suppressed. As a result, it is possible to suppress deterioration in the stretchability of the entire pressure-sensitive element.

Further, in the present exemplary embodiment, filamentous member 17 includes upper thread 17A and lower thread 17B as shown in FIGS. 5 and 6. By lower thread 17B penetrating insulator 16 and engaging with upper thread 17A, each of conductor wires 12 is sewn to base material 15 by filamentous member 17.

Each of conductor wires 12 is electrically connected to connector 21 as shown in FIG. 3. Each of conductors 11A is electrically connected to connector 22. Connector 21 and connector 22 are included in detector 2. As is apparent from the description of the measurement mechanism described above, in the pressure-sensitive element according to the present exemplary embodiment, an electrostatic capacity at an intersection of elastic conductor 11 and conductor wire 12 changes in accordance with a pressing force applied between base material 15 and conductor wire 12. Detector 2 detects a change in an electrostatic capacity between elastic conductor 11 and conductor wire 12 through connector 21 and connector 22, and detects a pressing force on the basis of the change in the electrostatic capacity. Further, detector 2 detects a pressed position by specifying a location where the electrostatic capacity has changed.

According to the pressure-sensitive element according to the present exemplary embodiment, elastic conductor 11 has elasticity. Therefore, when a pressing force is applied, an area of the contact region between elastic conductor 11 and conductor wire 12 changes in accordance with the elasticity of elastic conductor 11, and an electrostatic capacity between elastic conductor 11 and conductor wire 12 changes. The pressure-sensitive element according to the present exemplary embodiment detects a pressing force on the basis of a change in the electrostatic capacity. The change in the area of the contact region is relatively larger than a change in a distance between the electrodes in the conventional pressure-sensitive element. Therefore, according to the pressure-sensitive element according to the present exemplary embodiment, it is possible to measure a pressing force in a relatively wide range with a relatively simple structure.

Further, according to the pressure-sensitive element according to the present exemplary embodiment, there is provided filamentous member 17 that extends so as to intersect with the plurality of conductor wires 12 and sews the plurality of conductor wires 12 to base material 15. This configuration makes it possible to suppress a positional displacement of the plurality of conductor wires 12 with respect to elastic conductor 11, and more reliably detect a pressing force at a predetermined position.

Further, according to the pressure-sensitive element according to the present exemplary embodiment, elastic conductor 11 has the plurality of conductors 11A arranged in parallel so as to individually intersect with each of the plurality of conductor wires 12. That is, the plurality of conductors 11A and the plurality of conductor wires 12 are arranged so as to intersect in a matrix in plan view. According to this configuration, the detection accuracy of the pressed position can be improved.

Further, according to the pressure-sensitive element according to the present exemplary embodiment, base material 15 includes insulator 16 between conductors 11A and 11A adjacent to each other. This configuration makes it possible to suppress a short circuit due to contact between conductors 11A and 11A adjacent to each other, and to improve the measurement accuracy.

Further, according to the pressure-sensitive element according to the present exemplary embodiment, filamentous member 17 is sewn to insulator 16. This configuration makes it possible to suppress deterioration in the accuracy of the pressure measurement due to an occurrence of cracks in conductor 11A.

Further, according to the pressure-sensitive element according to the present exemplary embodiment, each of conductor wires 12 has inflection part 12a at a position facing insulator 16, and filamentous member 17 is sewn to insulator 16 so as to straddle these inflection parts 12a. This configuration makes it possible to further suppress a positional displacement of the plurality of conductor wires 12 with respect to elastic conductor 11, and to more reliably detect a pressing force at a predetermined position.

Further, according to the pressure-sensitive element according to the present exemplary embodiment, since filamentous member 17 has stretchability, it is possible to suppress deterioration in the stretchability of base material 15 due to filamentous member 17, and suppress deterioration in the stretchability of the entire pressure-sensitive element.

Figure 7:
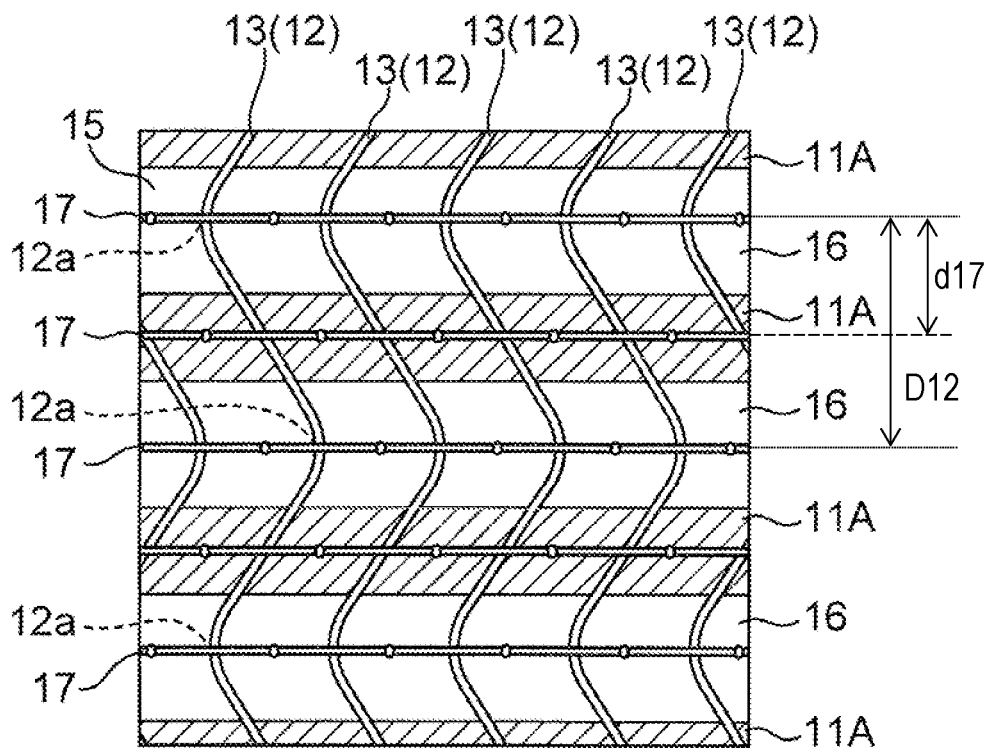
FIG. 7 is an enlarged plan view showing a first modification in which a plurality of conductor wires are sewn to a base material by a filamentous member.

Note that, in the above description, filamentous member 17 is sewn to insulator 16 so as to straddle inflection part 12a of each conductor wire 12, but the configuration of the pressure-sensitive element of the present disclosure is not limited to this. For example, as shown in FIG. 7, filamentous member 17 may be further sewn to base material 15 so as to straddle between inflection parts 12a and 12a adjacent to each other in each conductor wire 12 in plan view. According to this configuration, it is possible to further suppress a positional displacement of the plurality of conductor wires 12 with respect to elastic conductor 11, and to more reliably detect a pressing force at a predetermined position. Further, when a stranded wire formed by twisting a plurality of conductor wires 12 is used instead of conductor wire 12, filamentous member 17 can suppress loosening of the stranded wire. Note that filamentous member 17 may be sewn to conductor 11A of base material 15 as shown in FIG. 7.

Figure 8:
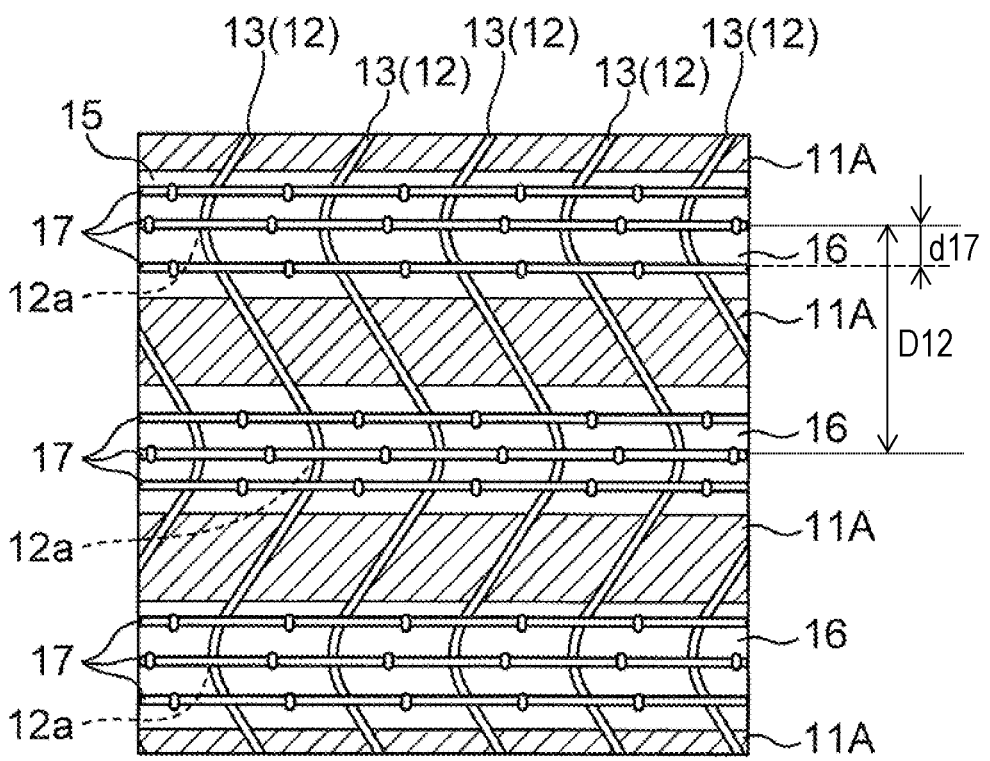
FIG. 8 is an enlarged plan view showing a second modification in which a plurality of conductor wires are sewn to a base material by a filamentous member.

Further, for example, as shown in FIG. 8, filamentous member 17 may be further sewn to insulator 16 so as to straddle between inflection parts 12a and 12a adjacent to each other in each conductor wire 12 in plan view. That is, a plurality of filamentous members 17 may be sewn to insulator 16. According to this configuration, it is possible to further suppress a positional displacement of the plurality of conductor wires 12 with respect to elastic conductor 11, and to more reliably detect a pressing force at a predetermined position. In addition, it is possible to suppress deterioration in the accuracy of the pressure measurement due to an occurrence of cracks in conductor 11A. Further, when a stranded wire formed by twisting a plurality of conductor wires 12 is used instead of conductor wire 12, filamentous member 17 can suppress loosening of the stranded wire.

Note that, in the configuration shown in FIGS. 7 and 8, interval d17 between filamentous member 17 straddling inflection part 12a and filamentous member 17 straddling a position farthest from inflection part 12a is desirably equal to or more than 10% of distance D12 between inflection parts 12a and 12a in the direction orthogonal to the extending direction of conductor 11A. Further, interval d17 is more desirably equal to or more than 25% of distance D12. This can even further suppress a positional displacement of the plurality of conductor wires 12 with respect to elastic conductor 11, and can more reliably detect a pressing force at a predetermined position.

Further, in the above description, filamentous member 17 includes upper thread 17A and lower thread 17B, but the configuration of the pressure-sensitive element of the present disclosure is not limited to this. For example, filamentous member 17 may include one thread alone, and sew the plurality of conductor wires 12 to base material 15 by sewing the thread to base material 15 in a standard form.

Figure 9:
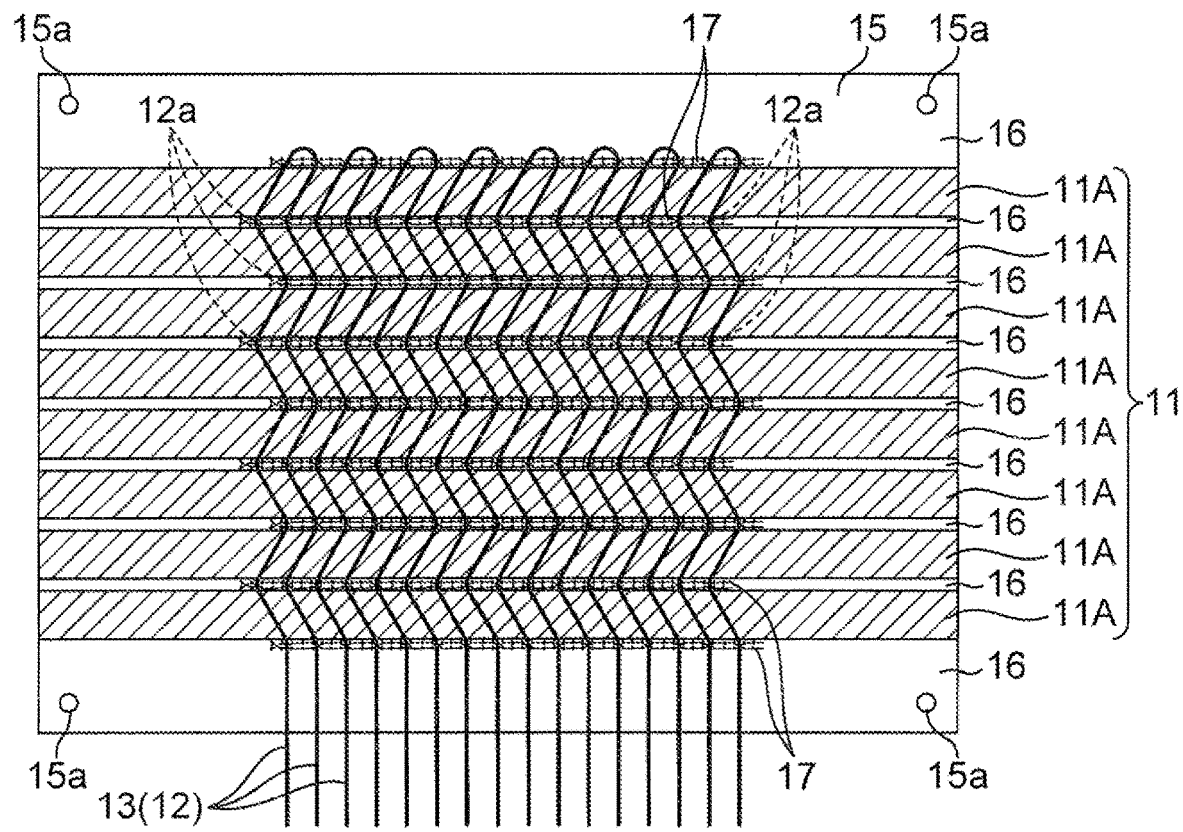
FIG. 9 is a plan view showing a third modification in which a plurality of conductor wires are sewn to a base material by a filamentous member.
Figure 10:
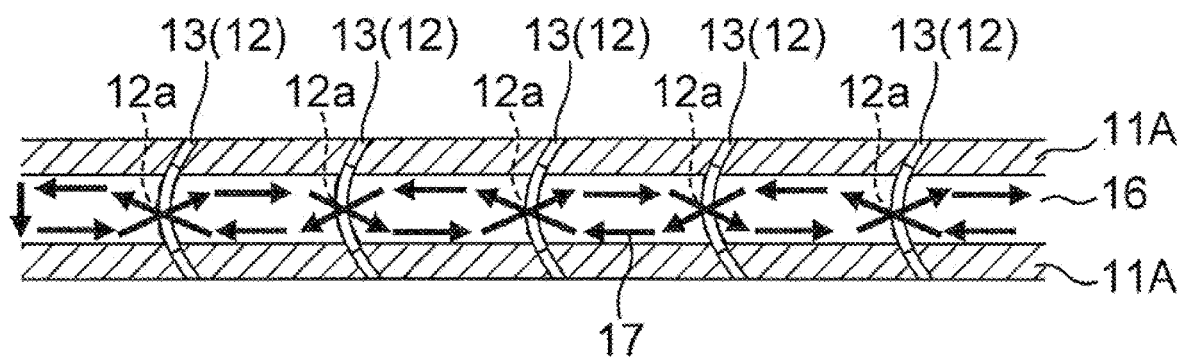
FIG. 10 is a partially enlarged plan view of FIG. 9.
Figure 11:
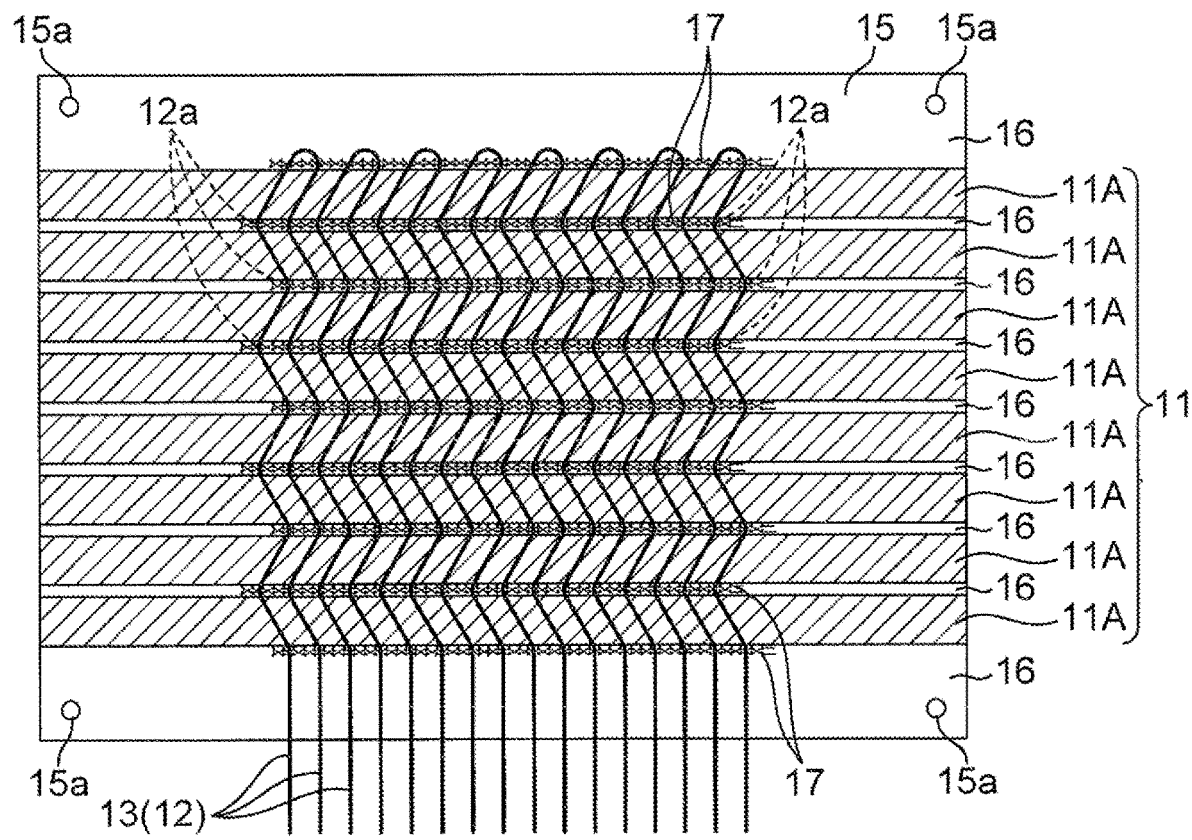
FIG. 11 is a plan view showing a fourth modification in which a plurality of conductor wires are sewn to a base material by a filamentous member.
Figure 12:
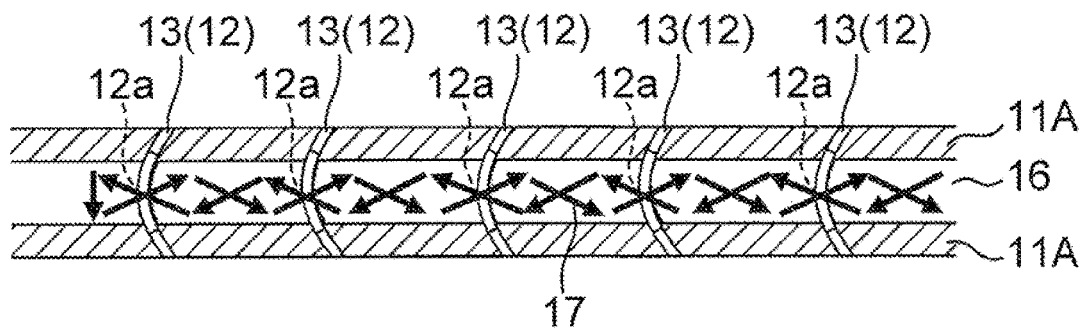
FIG. 12 is a partially enlarged plan view of FIG. 11.

Further, in the above description, filamentous member 17 is sewn in a straight line along the extending direction of insulator 16, but the configuration of the pressure-sensitive element of the present disclosure is not limited to this. For example, filamentous member 17 may be sewn to base material 15 so as to straddle inflection part 12a in a multiple manner in plan view. For example, as shown in FIGS. 9 and 10, filamentous member 17 may be sewn to reciprocate along the elongation direction of insulator 16, and such that the filamentous member sewn in a forward direction and the filamentous member in a backward direction intersect in an X shape at inflection part 12a. Such a sewing method is referred to as "X sewing A" here. Further, for example, as shown in FIGS. 11 and 12, filamentous member 17 may be sewn to travel in a wave shape in the elongation direction of insulator 16 and reciprocates, and such that the filamentous member sewn in a forward direction and the filamentous member in a backward direction intersect in an X shape at inflection part 12a. Such a sewing method is referred to as "X sewing B" here. According to these configurations, it is possible to further suppress a positional displacement of the plurality of conductor wires 12 with respect to elastic conductor 11, and to more reliably detect a pressing force at a predetermined position. Further, since filamentous member 17 has a wave shape to have stretchability, it is possible to suppress deterioration in the stretchability of base material 15 due to filamentous member 17, and suppress deterioration in the stretchability of the entire pressure-sensitive element.

Note that, in modified examples shown in FIGS. 9 to 12, one filamentous member 17 is reciprocated along the elongation direction of insulator 16, but the configuration of the pressure-sensitive element of the present disclosure is not limited to this. For example, filamentous member 17 sewn in the forward direction and filamentous member 17 sewn in the backward direction may be separate members. Note that, through hole 15a is provided near an end of base material 15.

Figure 13:
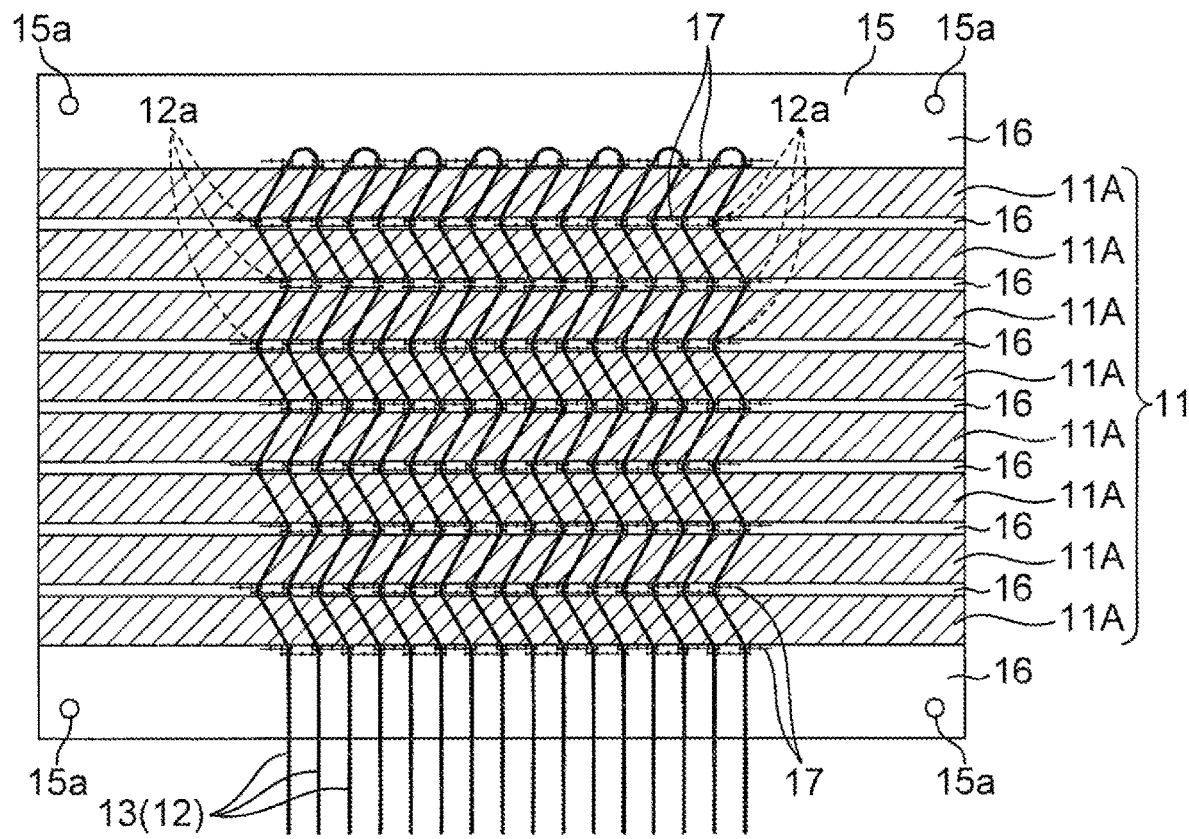
FIG. 13 is a plan view showing a fifth modification in which a plurality of conductor wires are sewn to a base material by a filamentous member.
Figure 14:
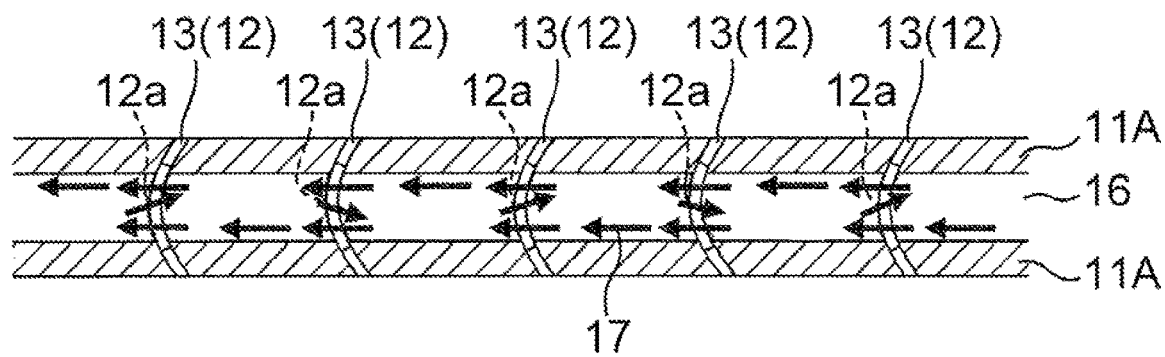
FIG. 14 is a partially enlarged plan view of FIG. 13.

Further, filamentous member 17 may be sewn to base material 15 so as to straddle a vicinity portion of inflection part 12a of conductor wire 12 three times or more in plan view. For example, as shown in FIGS. 13 and 14, filamentous member 17 may be sewn so as to travel along the elongation direction of insulator 16, and bend in an N shape in the vicinity of inflection part 12a in plan view to pass through inflection part 12a. That is, filamentous member 17 may be sewn so as to pass through conductor wire 12 in the traveling direction, then turn back diagonally in an opposite direction to the traveling direction to pass through inflection part 12a, and travel in the traveling direction again to pass through conductor wire 12. Such a sewing method is referred to as "N sewing" here. According to this configuration, it is possible to further suppress a positional displacement of the plurality of conductor wires 12 with respect to elastic conductor 11, and to more reliably detect a pressing force at a predetermined position. Further, as compared with the X sewing A and the X sewing B, the N sewing can perform sewing at a higher speed.

Although the present disclosure has been fully described in relation with a preferred exemplary embodiment with reference to the accompanying drawings, various modifications and corrections are obvious to those who are skilled in this technique. It should be understood that, as long as such modifications and corrections do not deviate from the scope of the present disclosure according to the appended claims, such modifications and corrections are included therein.

Since the pressure-sensitive element of the present disclosure has a relatively wide measurement range of a pressing force and a relatively simple structure while having more sufficient stretchability, for example, it is useful as a pressure-sensitive element to be mounted to an electronic device that variously uses freeform surfaces such as automobile interior parts.

What is claimed is:

1. A pressure-sensitive element comprising:
a base material having a sheet shape and including an elastic conductor having elasticity and conductivity;
a plurality of conductor wires arranged in parallel to intersect with the elastic conductor in plan view, the plurality of conductor wires each having a plurality of inflection parts;
a plurality of dielectrics individually arranged between the elastic conductor and the plurality of conductor wires; and
a filamentous member extending to intersect with the plurality of conductor wires in plan view, and configured to sew the plurality of conductor wires to the base material, wherein:
the pressure-sensitive element is configured to change an electrostatic capacity between each of the conductor wires and the elastic conductor in accordance with a pressing force applied between the base material and each of the conductor wires,
the elastic conductor includes a plurality of conductors arranged in parallel to individually intersect with each of the plurality of conductor wires in plan view, and
the base material includes a plurality of grooves provided in parallel at intervals from each other, and the plurality of conductors are disposed in the plurality of grooves, respectively.

2. The pressure-sensitive element according to claim 1, wherein
the base material is provided with an insulator between the conductors adjacent to each other, and
the filamentous member sews the plurality of conductor wires to the insulator.

3. The pressure-sensitive element according to claim 2, wherein each of the conductor wires has the plurality of inflection parts at positions facing the insulator, and the filamentous member sews the plurality of conductor wires to the insulator to straddle inflection parts of the plurality of conductor wires, the inflection parts each being included in the plurality of inflection parts of a corresponding one of the plurality of conductor wires.

4. The pressure-sensitive element according to claim 3, wherein the filamentous member further sews the plurality of conductor wires to the base material to straddle between inflection parts adjacent to each other in each of the conductor wires in plan view.

5. The pressure-sensitive element according to claim 3, wherein the filamentous member further sews the plurality of conductor wires to the insulator to straddle between inflection parts adjacent to each other in each of the conductor wires in plan view.

6. The pressure-sensitive element according to claim 3, wherein the filamentous member sews the plurality of conductor wires to the base material to straddle the inflection part in a multiple manner in plan view.

7. The pressure-sensitive element according to claim 3, wherein the filamentous member sews the plurality of conductor wires to the base material to straddle a vicinity portion of the inflection part of each of the conductor wires three times or more in plan view.

8. The pressure-sensitive element according to claim 2, wherein the insulator is made of a rubber material.

9. The pressure-sensitive element according to claim 1, further comprising
a sheet-shaped member arranged to face the base material with each of the conductor wires interposed in between.

10. The pressure-sensitive element according to claim 1, wherein the filamentous member has stretchability.

11. The pressure-sensitive element according to claim 1, wherein the elastic conductor is made of a conductive rubber material.

* * * * *